(12) United States Patent
Montaut et al.

(10) Patent No.: US 9,755,246 B2
(45) Date of Patent: Sep. 5, 2017

(54) HOLLOW PLATINUM NANOPARTICLES FOR FUEL CELLS

(71) Applicants: L'AIR LIQUIDE, SOCIETE ANONYME POUR L'ETUDE ET L'EXPLOITATION DES PROCEDES GEORGES CLAUDE, Paris (FR); INSTITUT POLYTECHNIQUE DE GRENOBLE, Grenoble (FR); CENTRE NATIONAL DE LA RECHERCHE SCIENTIFIQUE, Paris (FR)

(72) Inventors: Audrey Montaut, Grenoble (FR); Sandrine Moutin, Grenoble (FR); Marian Julien Chatenet, Meylan (FR); Julien Frederic Christophe Durst, Grenoble (FR); Frederic Thibaut Maillard, Grenoble (FR); Laetitia Dubau, Grenoble (FR)

(73) Assignees: L'AIR LIQUIDE SOCIETE ANONYME POUR L'ETUDE ET L'EXPLOITATION DES PROCEDES GEORGES CLAUDE, Paris (FR); INSTITUT POLYTECHNIQUE DE GRENOBLE, Grenoble (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 937 days.

(21) Appl. No.: 13/925,191

(22) Filed: Jun. 24, 2013

(65) Prior Publication Data

US 2013/0344421 A1 Dec. 26, 2013
US 2014/0227632 A2 Aug. 14, 2014

(30) Foreign Application Priority Data

Jun. 25, 2012 (FR) ...................... 12 55986

(51) Int. Cl.
H01M 4/92 (2006.01)
H01M 4/88 (2006.01)
(Continued)

(52) U.S. Cl.
CPC ............ *H01M 4/926* (2013.01); *B01J 21/18* (2013.01); *B01J 23/42* (2013.01); *B01J 35/002* (2013.01);
(Continued)

(58) Field of Classification Search
None
See application file for complete search history.

(56) References Cited

U.S. PATENT DOCUMENTS

2002/0192535 A1* 12/2002 Fukuda ............... H01M 4/8605
429/482
2009/0054228 A1* 2/2009 Ichikawa ............... B82Y 30/00
502/313

FOREIGN PATENT DOCUMENTS

JP A-2007-207679 8/2007
KR 100 728 199 B1 6/2007
(Continued)

OTHER PUBLICATIONS

Zhang et al., "Water-in-Oil Microemulsion Synthesis of Platinum-Ruthenium Nanoparticles, Their Characterization and Electrocatalytic Properties," *Chem. Mater.*, 2003, vol. 15, pp. 451-459.

(Continued)

*Primary Examiner* — Ula C Ruddock
*Assistant Examiner* — Tony Chuo
(74) *Attorney, Agent, or Firm* — Oliff PLC

(57) ABSTRACT

The present invention relates to hollow platinum nanoparticles with a diameter comprised between 3 and 20 nm which comprise a first central cavity and optionally at least one second cavity at the periphery of the first cavity, the shell of which is dense and single-crystal with a thickness comprised between 0.2 and 5 nm. The invention also relates to a method for manufacturing such nanoparticles, as well as to their use as an electrocatalyst in fuel cells.

9 Claims, 2 Drawing Sheets

(51) Int. Cl.

| | | |
|---|---|---|
| *B01J 23/42* | (2006.01) | |
| *B01J 21/18* | (2006.01) | |
| *B01J 35/00* | (2006.01) | |
| *B82Y 99/00* | (2011.01) | |

(52) U.S. Cl.
CPC ......... *B01J 35/006* (2013.01); *B01J 35/0013* (2013.01); *H01M 4/88* (2013.01); *H01M 4/92* (2013.01); *B82Y 99/00* (2013.01); *Y10S 977/773* (2013.01); *Y10S 977/81* (2013.01); *Y10S 977/895* (2013.01); *Y10S 977/948* (2013.01)

(56) References Cited

FOREIGN PATENT DOCUMENTS

| WO | WO 2012/009467 A1 | 1/2012 | |
|---|---|---|---|
| WO | WO 2012/105978 A1 * | 8/2012 | ............ B01J 23/44 |

OTHER PUBLICATIONS

Bonnemann et al., "Nanoscale Colloidal Metals and Alloys Stabilized by Solvents and Surfactants Preparation and Use as Catalyst Precursors," *Journal of Organometallic Chemistry*, 1996, vol. 520, pp. 143-162.
Antolini, "Formation, Microstructural Characteristics and Stability of Carbon Supported Platinum Catalysts for Low Temperature Fuel Cells," *Journal of Materials Science*, 2003, vol. 38, pp. 2995-3005.
Antoine et al., "In Situ Electrochemical Deposition of Pt Nanoparticles on Carbon and Inside Nafion," *Electrochemical and Solid-State Letters*, 2001, vol. 4, No. 5, pp. A55-A58.
Adzic et al., "Platinum Monolayer Fuel Cell Electrocatalysts," *Top Catal*, 2007, vol. 46, pp. 249-262.
Dubau et al., "Further Insights into the Durability of $Pt_3Co/C$ Electrocatalysts: Formation of "Hollow" Pt Nanoparticles Induced by the Kirkendall Effect," *Electrochimica Acta*, 2011, vol. 56, pp. 10658-10667.
Search Report issued in French Patent Application No. FR 1255986 dated Feb. 19, 2013 (with translation).
Written Opinion issued in French Patent Application No. FR 1255986 dated Feb. 19, 2013 (with translation).

* cited by examiner

HOLLOW PLATINUM NANOPARTICLES FOR FUEL CELLS

The present invention relates to stabilized platinum nanoparticles which are used as an electrocatalyst in fuel cells.

BACKGROUND

Fuel cells, such as proton exchange membrane fuel cells (abbreviated as « PEMFC » hereafter) are a promising alternative for supplying « clean » electric energy to stationary or mobile applications. However in spite of their excellent performances, their economical development is hampered by the high cost of their constitutive materials and the insufficient durability of the materials making up the membrane-electrodes assembly during real operation.

Within the scope of the present invention, by clean operation of a fuel cell is meant variations of potential caused by changes in the power output from the cell. At « full power », the potential of the cathode may fall to 0.5V relatively to the relative hydrogen electrode (RHE), or even to 0 V/RHE in the case of flooding/total oxygen consumption, while it may rise to 1 V/RHE in an open circuit (zero current) or more (up to 1.5 V/RHE) in transient starting/stopping phases and local fuel depletion at the anode.

The performance of the catalytic layer of a PEMFC is governed by several processes which have to be optimized simultaneously:

ion conduction ensured by the ionomer,
  electron conduction ensured by the carbonaceous support and
  diffusion of the reagent and of the reaction products in its porosity.

In order to increase the factor of use $u_{catalyst}$ (the fraction of the catalyst which is both in ion percolation with the membrane (via the ionomer of the catalytic layers) or in electron percolation (via the carbonaceous support)), metal deposition vacuum techniques (sputtering, plasma vapor deposition, chemical vapor deposition) allowing deposition of controlled amounts of catalyst (preferably platinum) at the surface of a gas diffusion electrode have demonstrated an interesting potential.

The electrocatalysts used in the catalytic layers of PEMFC may be:

« solid » platinum nanoparticles which are supported on carbon with a high specific surface area. This type of electrocatalyst is abbreviated hereafter as: « Pt/C »;
  « solid » multi-metal nanoparticles, i.e. in addition to platinum they contain other metal elements (generally transition metals) and are supported on a carbon with high specific surface area. This type of electrocatalyst is abbreviated hereafter as: « $Pt_xM/C$ ».

Within the scope of the present invention, the « nanoparticules are supported on a carbon », which means that the nanoparticles are generally, because of physisorption phenomena, « laid » on the carbon and interact with the carbon support through dipolar or weak bonds.

The carbon support has the function of stabilizing the nanoparticles which, in its absence, would agglomerate with each other. This would lead to:

a dispersion loss (the ratio between the number $N_{surface}$ of platinum atoms present at the surface and the total number $N_{total}$ of atoms contained in a nanoparticle which is practically expressed as the ratio of electrochemically active surface area/platinum mass used),
  small electrochemically weak active areas, and
  poor distribution of the nanoparticles in the volume of the electrode.

These consequences would not be compatible with good electrical performances.

The size of « solid » electrocatalyst nanoparticles is generally comprised between 1 and 5 nm.

At the anode of the PEMFC, the platinum electrocatalyst on a carbon support (Pt/C) is used for oxidizing dihydrogen into protons and electrons.

At the cathode of the PEMFC, the platinum electrocatalyst on a carbon support (Pt/C) catalyzes the oxygen reduction reaction leading to the formation of water. This reaction occurs at a high potential, or the order of 0.6 to 1 V/HRE. The result of this is instability of the platinum nanoparticles and therefore a loss of electrochemically active surface area of the nanoparticles, because of aging of the Ostwald maturation type.

Indeed, the platinum nanoparticles may be corroded into $Pt^{z+}$ ions (with z=2,4). This corrosion preferentially occurs on the smallest platinum nanoparticles, as shown by Gibbs-Thompson equation (Equation 1) below, wherein $\mu_i$ is a chemical potential, $v_m$ is the volume of an atom and $\gamma$ the surface tension:

$$\mu_{i,(d)} = \mu_{i,(d=\infty)} + \frac{4v_m\gamma}{d} \qquad \text{Equation 1}$$

This equation shows that due to the excess surface energy, the chemical potential of small size nanoparticles is higher than that of a massive material $\mu_{i,(d=\infty)}$.

The produced $Pt^{z+}$ ions (z=2,4) may be re-deposited electrochemically (reduction by the electrochemical potential) or chemically (reduction by the dihydrogen from the anode) on larger size nanoparticles (for which the standard potential is higher) resulting in fine in an increase in the average size of the electrocatalyst nanoparticles. The aforementioned equation 1 shows that the latter will then be more stable towards this phenomenon, since the more electrocatalyst nanoparticles are of a significant size, the more they are stable.

By decreasing the size of the platinum nanoparticles for their use as an electrocatalyst in PEMFCs, it is possible to increase the dispersion of the platinum. In terms of mass activity of the electrocatalyst, the optimum is nevertheless obtained with diameters of the order of 3 to 4 nm, a size which is difficult to control for electrocatalysts for which the platinum mass percentage referred to the carbon substrate mass (i.e. $m_{pt}/(m_{pt}+m_c)$) is greater than 30%, because of the marked trend to agglomeration of the platinum nanoparticles, this reduces their dispersion by as much.

However, the decrease in the size of the platinum nanoparticles is not fully satisfactory, because the kinetics of the oxygen reduction reaction decreases consequently, when the size of the nanoparticles is less than the size of the order of 3 to 4 nm.

This is why, as mentioned above, in the technical field of PEMFC electrolyzers, platinum alloyed to a second less noble element such as a transition metal ($Pt_xM/C$ avec M=Co, Ni, Cu, Cr for example and x comprised between 0.2 and 10, preferably between 0.5 and 3) is used.

This has the two following advantages:

(i) decrease in the mass of precious metal (i.e. platinum) used in the catalytic layer and therefore in its cost, (ii) multiplication of the specific activity for the oxygen reduction reaction (the ratio of the catalytic activity to the area of the catalyst) by a factor from 2 to 4 as compared with a Pt/C type electrocatalyst as detailed above.

As the ageing mechanisms are similar from a morphological point of view on electrocatalysts of the Pt/C type or of the $Pt_xM/C$ type, Ostwald maturation also remains a problem during the operation of a PEMFC cathode. Ageing is even worsened by the presence of a less noble metal M (and therefore more corrodible) than the platinum. The metals M alloyed to platinum are actually unstable from a thermodynamical point of view. Severe depletion of the less noble metal is seen, not only at the surface but also in the core of the material of the electrocatalyst during operation of the PEMFC. This causes marked decrease in the specific activity (down to values sometimes less than that of platinum) and severe poisoning of the ionomer and of the proton exchange membrane by the thereby produced $M^{p+}$ ions. Of course, the larger size of the bimetal crystallites gives the possibility of attenuating the significance of this phenomenon.

The $Pt^{z+}$ (z=2, 4) and $M^{p+}$ ions (in the case of multi-element alloys for an electrocatalyst of the $Pt_xM/C$ type) produced by the corrosion of the nanoparticles are redistributed in the membrane-electrode assembly by the two following phenomena:
  migration (electric potential gradient), and
  diffusion (chemical potential gradient).
When the PEMFC operates, migration theoretically maintains these ions in the cathode catalytic layer, which causes poisoning of the sulfated terminations of the ionomer (ion conductor) and a strong decrease in the electrocatalytic activity for the oxygen reduction reaction of the electrocatalyst of the type $Pt_xM/C$ in contact with this ionomer. These ions may diffuse into the proton exchange membrane and into the gas diffusion layer upon interrupting the operation of the PEMFC (for example during a maintenance operation).

Further, in addition to the electrocatalyst nanoparticles being subject to electrochemical corrosion combined with ageing of the Ostwald maturation type during the operation of a PEMFC, the following physical phenomena occur and also contribute to causing a time-dependent change in the structure and the chemical composition of the electrocatalyst:
  1) The carbonaceous support is strongly oxidized during certain stress modes of the PEMFC, such as the stopping and starting periods of the latter.
  2) The electrocatalyst crystallites are not motionless at the surface of the carbonaceous support but are coalescent after surface diffusion (« migration of the crystallites »). This phenomenon may be accelerated by the corrosion of the carbonaceous support.

SUMMARY

The present invention proposes finding a remedy to the ageing problems of the Ostwald maturation type and of electrochemical corrosion of the nanoparticles on a carbonaceous support of an electrocatalyst for fuel cells such as the PEMFC mentioned above, by providing electrocatalyst nanoparticles with increased stability.

To do this, the inventors of the present invention developed novel electrocatalyst nanoparticles exhibiting the following remarkable physical properties:
  1) they are hollow;
  2) their average size was increased as compared with electrocatalyst nanoparticles presently used;
  3) they do not include any alloy elements of the non-noble metal type;
  4) their number of atoms with low coordination (more sensitive to electrochemical corrosion) has been limited.

The first object of the present invention is therefore a hollow platinum nanoparticle which is characterized in that:
  said nanoparticle has a diameter comprised between 3 nm and 20 nm, preferably between 3 and 10 nm;
  said nanoparticle comprises a first central cavity and optionally at least one second cavity at the periphery of said first central cavity;
  said nanoparticle comprises a dense and single-crystal shell, the thickness of which is comprised between 0.2 nm and 5 nm, preferably between 0.277 nm and 0.831 nm (which corresponds to 1 to 3 platinum atom monolayers);
  said nanoparticle does not include any alloy elements of the non-noble metal type;
  said nanoparticle is quasi-spherical.

By a dense shell is meant within the scope of the present invention that the shell is without any porosity at an atomic scale.

Preferably, the nanoparticle comprises a single central cavity.

Thus, the electrocatalyst nanoparticles according to the invention have the following advantages as compared with those presently used in fuel cells such as PEMFCs:
  1) They are much more active for the oxygen reduction reaction;
  2) They include a limited platinum mass; and
  3) They have increased durability.

Preferentially, the central cavity of the nanoparticle according to the invention has diameter comprised between 2 nm and 10 nm, preferably between 2 nm and 5 nm. This has the advantage of good dispersion of the platinum within the nanoparticle.

The dispersion is the ratio between the number $N_{surface}$ of platinum atoms present at the surface and the total number $N_{total}$ of atoms contained in a nanoparticle. The greater the dispersion, the larger is the number of electrocatalytically active platinum atoms, i.e. those which are located at the surface of the material. If, for a given platinum mass, it is possible to optimize the dispersion of the atoms, the activity of the resulting electrode will be all the more significant.

The dispersion according to the invention is close to that of small solid platinum nanoparticles, but with higher intrinsic activity. Thus, there is no loss of electrolytic active surface area with the nanoparticles according to the invention and the effective mass activity (the current referred to the total platinum mass) is more significant.

Further, because of the vacuum inside the shell, the lattice parameter of the shell consisting of platinum is slightly contracted as compared with solid platinum nanoparticles of equivalent sizes. This contraction percentage does not exceed 0.5%.

In other words, the external surface of the nanoparticles according to the invention is little or not faceted Thus, the nanoparticle according to the invention comprises a number of atoms with low coordination that is less than 10% of the total number of atoms of surface. Preferably, the nanoparticle according to the invention comprises a number of atoms with low coordination that is less than 5% of the total number of atoms of surface, and more preferably it does not comprise any atom with low coordination.

Now, it is quite advantageous to limit the number of atoms with low coordination for the following reasons:

1) Atoms with low coordination, having less direct neighbors than those contained in the volume of a solid platinum nanoparticle, are sensitive to the adsorption of oxygenated surface species, which are poisons for the oxygen reduction reaction. This is why a decrease in their surface concentration generates an increase in the electrocatalytic activity of the nanoparticles for the oxygen reduction reaction.

2) Further, these sites of low coordination initiate the reaction for dissolving the platinum atoms and therefore generate lesser resistance to corrosion.

The object of the present invention is also a method for manufacturing hollow platinum nanoparticles as described above which comprises the following steps:

a) Multi-metal nanoparticles on a carbonaceous support of the $Pt_xM/C$ type, with x comprised between 0.2 and 10 (preferably between 0.5 and 3) and M being a less noble metal than platinum, are placed in a device configured for submitting these nanoparticles to a sequence of polarizations;

b) A sequence of polarizations is carried out on said nanoparticles between the two following potentials:
a reducing potential comprised between 0 and 0.5 V/RHE (i.e. measured with reference to a reversible hydrogen electrode) and
an oxidizing potential comprising between 0.9 and 3 V/RHE (i.e. measured with reference to a reversible hydrogen electrode),
until single-crystal hollow platinum nanoparticles with a diameter comprised between 3 nm and 20 nm and the shell of which is dense with a thickness comprising 0.2 and 5 nm are obtained.

The metal M is advantageously selected from the group formed by scandium, yttrium, titanium, zirconium, vanadium, niobium, tantalum, chromium, molybdenum, tungsten, manganese, rhenium, iridium, iron, ruthenium, osmium, cobalt, rhodium, nickel, palladium, copper, silver, gold, zinc and cadmium.

Preferably, in step a) of the method according to the invention, nanoparticles are placed on a carbon support (supported nanoparticles of the $Pt_3Co/C$ type).

Advantageously, the sequence of polarizations of step b) of the method according to the invention is carried out with:
a succession of linear ramps of (rising and falling) potentials at a potential sweeping rate in the range of 1-1,000 mV s$^{-1}$;
a succession of plateaus of potentials with a duration comprised between 1 second and 36,000 s; or
a mixture of ramps and plateaus for the rising (respectively falling) potential phases.

In an advantageous embodiment of the invention, a sequence of rectangular polarizations is used, in other words a profile for which the characteristics are the following:
a reducing potential comprised between 0.05 V/RHE and 0.5 V/RHE, preferably between 0.2 V/RHE and 0.4 V/RHE;
an oxidizing potential comprised between 0.60 V/RHE and 1.4 V/RHE, preferably between 0.8 V/RHE and 1 V/RHE.

The periods spent at the reducing potential have to be sufficiently long for the migration of the different atoms M of the platinum, for example cobalt in the case of nanoparticles on a carbon support of the $Pt_3Co/C$ type, from the center of said nanoparticle to the region in proximity to the surface of the latter. Advantageously, the time spent at the reducing potential is comprised between 5 minutes and 10 hours, preferably between 30 minutes and 2 hours.

The periods spent at the oxidizing potential have to be a compromise between the following aspects:
They should be sufficiently long in order to oxidize the metal different from platinum (for example cobalt in the case of $Pt_3Co/C$) present in the region in proximity to the surface of the nanoparticles, but
They should be short in order not to degrade the structure of the nanoparticle (by corroding the platinum atoms of the nanoparticle).

The time spent at the oxidizing potential is advantageously comprised between 10 seconds and 1 hour, preferably between 30 seconds and 10 minutes.

The duration of step b) of the manufacturing method according to the invention is primordial and should preferentially be sufficient so that the metal(s) M different from platinum (for example cobalt in the case of nanoparticles of the $Pt_3Co/C$ type) which the nanoparticles contain, be leached out of said nanoparticles.

The step b) is carried out in an electrolytic solution which may be:
an acidic solution which comprises at least one acid, preferably selected from the group formed by acetic acid, hydrochloric acid, nitric acid, sulfuric acid, perchloric acid, hydrobromic acid, hydroiodic acid or combinations of these acids, with a concentration between $10^{-3}$ and $10^{-5}$ mol.L$^{-1}$, preferably between 0.1 and 1 mol.L$^{-1}$;
a basic solution, preferably a soda solution, a potash solution or a mixture of these bases, with a concentration $10^{-3}$ and $10^{-5}$ mol.L$^{-1}$, preferably between 0.1 and 1 mol.L$^{-1}$;
an ionomer (for example NAFION®).

By the Kirkendall effect, during step b) of the manufacturing method according to the invention, the metal(s) M diffuse faster than the platinum atoms when the nanoparticles are in an oxidizing environment. The driving forces for the phenomenon of diffusion of the atoms of the metals M towards the surface of the nanoparticle are the following:
the chemical potential gradient within the nanoparticle, the surface of which is poor in metal M since this element is instantaneously dissolved in an acid environment, for which the core is richer in metals M;
the high overlapping rate of oxygenated species (as the metals M are less noble than platinum, they have a standard enthalpy for forming oxides MO, $M_2O_3$, $MO_2$) which is more negative than the one observed on platinum.

Since each metal atom M which reaches the surface of the nanoparticle is corroded into a $M^{p+}$ ion, both forces persist over time.

In this respect, it should be known that the Kirkendall effect occurs in bimetal materials AB wherein an element A diffuses faster than the element B. If the flow of A has a preferential direction (generally from the core of the material towards its surface), a flow of vacancies penetrates into the material in the opposite direction in order to compensate for the flow of atoms A. These vacancies aggregate by forming cavities of variable size.

Advantageously, step b) is carried out until single-crystal hollow platinum nanoparticles with a diameter comprising 3 nm and 10 nm and for which the shell is dense with a thickness comprised between 0.277 nm and 0.831 nm (i.e. 1 to 3 atomic layers of platinum) are obtained.

In a preferred embodiment, step b) of the method according to the invention lasts for between 48 hours and 100 hours, preferably between 54 hours and 72 hours, with a duration of each reducing potential from 10 minutes to 2 hours, preferentially from 45 minutes to 1 hour and 15 minutes, and that of each oxidizing potential from 1 to 10 minutes, preferentially from 3 to 6 minutes.

The method according to the invention may further comprise a step c) at the end of step b) during which said nanoparticles are cleaned in an acidic solution.

Step c) of the method for manufacturing nanoparticles according to the invention gives the possibility of getting rid of the presence of $M^{z+}$ ions after step b).

Preferably, in step c) of the method according to the invention, the acidic solution comprises at least one acid that is selected from the group formed by acetic, hydrochloric, nitric, sulfuric, perchloric, hydrobromic, hydroiodic acids or combinations of these acids.

Preferentially, step c) is carried out at a temperature comprised between 20° C. and 80° C., in two or three successive washes with the acid initially without any impurities at each wash. The amount of acid used in step c) is advantageously comprised between 0.01 L and 1 L, preferably between 0.05 L and 0.2 L. The washing duration sufficient for removing all the metal salts is advantageously comprised between 10 minutes and two hours, preferably between 15 and 30 minutes.

In an embodiment of the invention, the method for manufacturing nanoparticles according to the present may further comprise a step c') of post-treatment which is carried out:
  either directly at the end of step b) if the method does not comprise step c);
  or at the end of step c) if the method comprises step c).

The step c') of post-treatment of the method is carried out for enhancing the mobility of the atoms of platinum on short scale. This mobility of the atoms of platinum has the effect of filling the vacancies of the shell of the hollow platinum nanoparticle so that to smooth its surface.

Step c') allows the elimination of atoms with low coordination.

As step c') is carried out, by the displacement of platinum atoms, the vacancies tend to aggregate with each other and to move in the direction of the hollow centre of the nanoparticle. In other words, this step of post-treatment has for effect to increase the density of the shell of the hollow platinum nanoparticle according to the invention.

In an embodiment of the invention, step c') is carried out in an oven at a controlled temperature comprised between 100° C. and 600° C., preferably between 120° C. and 350° C., during a duration comprised between 10 minutes and 10 hours, preferably between 30 minutes and 2 hours.

Advantageously, this step c') is carried out under a controlled atmosphere:
  neutral (with argon);
  oxidative (with air or dioxygen);
  reductive (mixture of argon and dihydrogen or mixture of hydrogen and carbon monoxide).

Preferably, the controlled atmosphere is oxidative, the gas being advantageously dioxygen.

This embodiment of step c') allows to increase the density of the shell of the hollow platinum nanoparticle and to smooth it.

In another embodiment of the invention, step c') is an electrochemical post-treatment which consists in carrying out a sequence of polarizations in an electrolytic solution that is different from the electrolytic solution of step b) and which may be:
  an acidic solution which comprises at least one acid, preferably selected from the group formed by acetic acid, hydrochloric acid, nitric acid, sulfuric acid, perchloric acid, hydrobromic acid, hydroiodic acid or combinations of these acids, with a concentration between $10^{-3}$ and $10^{-5}$ mol.$L^{-1}$, preferably between 0.1 and 1 mol.$L^{-1}$;
  a basic solution, preferably a soda solution, a potash solution or a mixture of these bases, with a concentration $10^{-3}$ and $10^{-5}$ mol.$L^{-1}$, preferably between 0.1 and 1 mol.$L^{-1}$;
  an ionomer (for example NAFION®).

The electrolytic solution that is used for step c') is a regenerated electrolytic solution or a new electrolytic solution in relation to the electrolytic solution used for step b). In other words, the electrolytic solution of step c') does not contain any of non-noble metals.

The sequence of polarizations is carried out with:
  a succession of linear ramps of (rising and falling) potentials at a potential sweeping rate in the range of 1-1,000 mV $s^{-1}$;
  a succession of plateaus of potentials with a duration comprised between 1 second and 36,000 s; or
  a mixture of ramps and plateaus for the rising (respectively falling) potential phases.

In an advantageous embodiment of the invention, a sequence of rectangular polarizations is used, in other words a profile for which the characteristics are the following:
  a reducing potential comprised between 0.05 V/RHE and 0.5 V/RHE, preferably between 0.2 V/RHE and 0.4 V/RHE;
  an oxidizing potential comprised between 0.60 V/RHE and 1.4 V/RHE, preferably between 0.8 V/RHE and 1 V/RHE.

Preferably, in this embodiment of the invention, step c') is carried out under a controlled atmosphere:
  neutral (with argon);
  oxidative (with air or dioxygen);
  reductive (mixture of argon and dihydrogen or mixture of hydrogen and carbon monoxide).

Advantageously, the controlled atmosphere is oxidative, the gas being advantageously dioxygen.

This embodiment of step c') allows smoothing the hollow platinum nanoparticle according to the invention.

If the step c') is carried out under a controlled atmosphere as detailed above, the gas of the atmosphere interact with the surface of the hollow platinum nanoparticle and enhance the mobility of the platinum atoms.

In a first embodiment of the manufacturing method according to the invention, the configured device for submitting the nanoparticles to a sequence of polarizations consists in an electrode (for example thin active layer deposited on the tip of a rotating disk electrode, gas diffusion electrode, volumic electrode, carbon paste electrode) or a membrane-electrodes assembly of a fuel cell which comprises nanoparticles on a carbon support of the $Pt_xM/C$ type, preferably of the $Pt_3Co/C$ type as an electrocatalyst. Such a device is marketed and is therefore perfectly within the reach of one skilled in the art.

In other words, this first embodiment corresponds to the manufacturing in situ of nanoparticles from an electrocatalyst of the $Pt_xM/C$ type, a so-called «commercial» type, which has been integrated into an electrode or a membrane-electrodes assembly of a fuel cell. The manufacturing method according to the invention then consists in accelerated and suitable ageing of the electrocatalyst of the fuel cell in order to obtain an electrocatalyst with hollow platinum nanoparticles exhibiting better durability and catalytic properties than the commercial electrocatalysts mentioned above of the $Pt_xM/C$ type like $Pt_3Co/C$ type.

In a second embodiment of the method, the configured device for submitting the nanoparticles to a sequence of polarizations consists in a rotary conducting drum. The nanoparticles on a carbon support of the $Pt_xM/C$ type (preferably $Pt_3Co/C$ nanoparticles) are placed in the rotary conducting drum and are immersed in an electrolyte which advantageously comprises an acid, preferably an acid at a concentration comprised between 0.05 and 6 mol/L, even more preferentially between 0.1 and 1 mol/L, said acid being advantageously selected from the group formed by sulfuric, perchloric, hydrochloric, nitric acid or a mixture of these acids.

In this second embodiment of the method according to the invention, the velocity of the rotary conducting drum may be very slow, i.e. of the order of 1 rpm, and this so as to slowly mix the nanoparticles while retaining good electronic contact between the nanoparticles and the current collector (i.e. the drum).

In other words, this second embodiment corresponds to the making ex situ of nanoparticles on a carbon support from an electrocatalyst of the $Pt_xM/C$ type, a so-called « commercial » catalyst, which has not yet been integrated into an electrode or a membrane-electrodes assembly of a fuel cell.

Further, the application of this second embodiment is exclusively carried out on the nanoparticles on a carbon support and not on the other components of the fuel cell. This has the advantage of avoiding « degradation » of the other components of the fuel cell, such as the proton exchange membrane and the electrodes, during step b) of the manufacturing method according to the invention.

In an embodiment of the invention, the nanoparticles of PtxM/C type used as initial material for the manufacturing method according to the invention have been obtained via a chemical route in the following way:

a') Colloidal nanoparticles of a metal M are made on a carbon support, i.e. of the M/C type, the metal M being less noble than platinum, from $M^{z+}$ metal salts, and this preferably by:
  a technique of impregnation/reduction via a chemical route;
  a technique of impregnation/reduction via an electrochemical route;
  a water/oil/surfactant microemulsion method or else by the Bönneman colloid method.
b') A platinum deposit is made on the nanoparticles obtained at the end of step a').

Within the scope of the present invention, the preparation of colloidal nanoparticles by a water/oil/surfactant microemulsion technique may be a method as described in the publication entitled Water-in-oil Microemulsion Synthesis of Platinum-Ruthenium Nanoparticles, their Characterization and Electrocatalytic Properties, of Zhang et al., Chem. Mater. 2003, 15, 451-459.

The publication entitled Nanoscale colloidal metals and alloys stabilized by solvents and surfactants Preparation and use as catalyst precursors of Bönneman et al., Journal of Organometallic Chemistry 1996, 520, 143-162 describes the preparation of colloidal nanoparticles by the Bönneman colloid method.

The publication Formation, microstructural characteristics and stability of carbon supported platinum catalysts for low temperature fuel cells, de Antolini et al., Journal of Materials Science 2003, 38, 2995-3005 describes the preparation of nanoparticles by techniques of impregnation/reduction via a chemical route.

The publication In situ electrochemical deposition of Pt nanoparticles on carbon and inside Nafion, de Antoine et al., Electrochemical and Solid-State Letters, 2001, 4, A55-A58 describes the preparation de nanoparticles by techniques of impregnation/reduction via an electrochemical route.

The metal M is advantageously selected from the group formed by scandium, yttrium, titanium, zirconium, vanadium, niobium, tantalum, chromium, molybdenum, tungsten, manganese, rhenium, iridium, iron, ruthenium, osmium, cobalt, rhodium, nickel, palladium, copper, silver, gold, zinc and cadmium.

The microemulsion and Bönneman colloid methods are particularly suitable, since they give the possibility of obtaining particles having a narrow detailed particle distribution.

Once they are coated with platinum, the nanoparticles obtained at the end of step b') are quite advantageous as starting materials for the method for manufacturing hollow platinum nanoparticles according to the invention which was described above.

The surfactant used in step a') is preferentially 2-dodecoxyethanol (marketed under the trade name of BRIJ 30) which may then be removed by simple washing with a suitable solvent at the end of step a'). This gives the possibility of avoiding any heat treatment forming a sintering source for the nanoparticles.

The $M^{z+}$ metal salts used are preferably chlorinated salts.

During step a'), preferably the $M^{z+}$ salts are dissolved in water which forms the aqueous phase. The organic phase consists of the mixture of a surfactant (preferably 2-dodecoxyethanol) with an organic solvent such as n-heptane.

During step a'), there is reduction of the $M^{z+}$ metal salts.

The platinum deposit is then advantageously made at the surface of the nanoparticles obtained at the end of step a') via an electrochemical or chemical route, and this from a $Pt^{z+}$ salt in aqueous medium.

In an advantageous embodiment of the invention, the deposition of platinum consists in:
  the adsorption of copper under a sub-potential at the surface of the nanoparticles obtained at the end of step a') so as to cover said nanoparticles with a copper monolayer, followed
  by galvanic displacement of said copper layer by a platinum monolayer from a $Pt^{z+}$ solution.

The adsorption under a sub-potential of copper may be achieved with the Adzic method described in the publication entitled Platinum Monolayer Fuel Cell Electrocatalysts, Adzic et al. Top. Catal 2007, 46, 249-262.

During this method, a copper monolayer is deposited, under a sub-potential, for example at 0.32 V, at the surface of the metal M nanoparticle. This is a reaction limited to a monolayer. Because of the redox potential difference of the pairs $Pt^{2+}/Pt$ and $Cu^{2+}/Cu$, the copper atoms in a second phase are spontaneously exchanged with platinum atoms by simply immersing the particles in an electrocatalytic solution containing a platinum salt. The platinum salt used may be $K_2PtCl_4$ so that the degrees of oxidation of the platinum and that of the copper are identical, thereby guaranteeing an atom-by-atom exchange. This process allows control of the thickness of the platinum shell, since it may be repeated according to the number of desired platinum monolayers. In other words, the thickness of the platinum shell is specifically adjusted.

During the galvanic displacement step, the $Pt^{z+}$ platinum salt used is advantageously an aminated or chlorinated complex, and this at a concentration comprised between 0.0001 and 5 mol/L, preferably between 0.001 and 1 mol/L. The platinum salt is put into contact at a temperature comprised between 10 and 80° C., preferably between 20 and 40° C., under mechanical stirring, with M metal nanoparticles on a carbon support, on which a copper monolayer has been deposited beforehand under a sub-potential, which promotes the dissolution of the copper into a metal ion $Cu^{2+}$ catalyzed by the $Pt^{2+}$ platinum salt ions which are deposited, according to the galvanic displacement reaction: $Pt^{2+}+Cu \rightarrow Pt+Cu^{2+}$.

In another embodiment of the invention, the platinum is deposited on the nanoparticles on a carbon support of the M/C type obtained at the end of step a') by the direct cementation technique. Direct cementation is advantageously achieved in an acid medium at a pH comprised between 1 and 5, preferably between 0 and 3 and directly (and jointly) leads to the deposition of platinum and to dissolution in $M^{y+}$ of the underlying non-noble metal atoms, according to the reaction: $Pt^{2+}+M \rightarrow Pt+M^{2+}$.

Once the $Pt_xM/C$ nanoparticles are obtained, by suitable potential cycling as explained above according to step b) of the manufacturing method, it is possible to obtain hollow nanoparticles of the Pt/C type.

The object of the present invention is also the use of hollow platinum nanoparticles as described above as an electrocatalyst for any device such as fuel cells which operate at a low temperature, preferably at a temperature below 250° C. These may be:
  alkaline cells of the AFC type;
  phosphoric acid cells of the PAFC type,
  proton exchange membrane cells, for example of the PEMFC, HT-PEMFC types;
  cells with direct alcohol oxidation, for example of the DMFC, DEFC types;
  cells with direct oxidation of other lightweight organic compounds;
  cells with direct oxidation of borohydride, for example of the DBFC type.

More generally, the hollow platinum nanoparticles according to the invention may be used in any device operating at a low temperature, preferably at a temperature below 250° C., from which mention may be made of:
  hydrogen generation electrolyzers (alkaline, PEM, Westinghouse technology);
  electrolyzers generating chlorinated products (chlorine-soda, chlorate, perchlorate electrolysis);
  electrolyzers generating hydrogen peroxide;
  reducing gas (carbon monoxide, methane, hydrogen, etc.,) or oxidizers (oxygen, ozone, carbon dioxide, etc.) sensors;
  metal-air (Al-air, Zn-air, Li-air) batteries.
  any other device using a cathode with oxygen reduction operating at a temperature of less than 250° C.

DETAILED DESCRIPTION OF EMBODIMENTS

Figure 1:
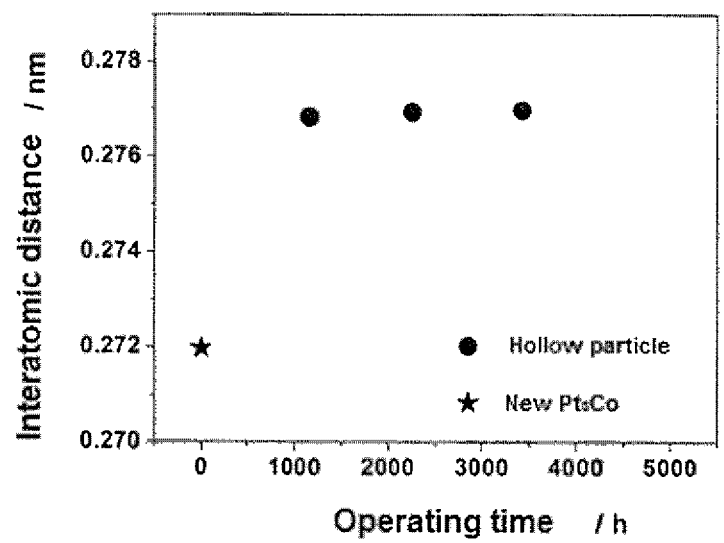
FIG. 1 is a graph indicating the interatomic distance (expressed in nanometers) of the nanoparticles of a cathodic electrocatalyzer versus the duration of use of a PEMFC during actual operation.

Hollow platinum nanoparticles were obtained in the following way:

A PEMFC was used for 3,500 hours under the following conditions:
  cathodic electrocatalyst of the $Pt_3Co/C$ type, humidified air (65% relative humidity, 1.1 bars absolute, stoichiometry 2.5);
  anodic electrocatalyst: pure dihydrogen (0% relative humidity, 1.3 bars absolute, blocked mode (dead-end mode) stoichiometry 2.5);
  temperature of 70° C.;
  50 ampere intensity current.

The cathodic electrocatalyst was observed with a transmission electron microscope in a scanning mode with a wide angle annular dark field detector (STEM-HAADF).

STEM-HAADF is a technique allowing characterization of bimetal nanoparticles, since it provides images including chemical information, called a «Z contrast» image (Z being the atomic number of the element).

In this imaging mode, the intensity of the image (I) of an atomic column is in a first approximation, proportional to the product of the number (N) of the atoms present in the atom column and to the square of the average atomic number Z of the atoms making it up:

$$I_{HAADF}=kNZ^\alpha \qquad \text{Equation 2}$$

wherein k is a constant and $\alpha \sim 2$.

Analysis of the cathodic electrocatalyst after about 1,000 hours of operation of the PEMFC has shown the presence of two types of nanoparticles:
  Some of the nanoparticles had a bright shell covering a darker core, generally with a large intensity difference between the core and the shell. These are hollow particles.
  The remainder of the nanoparticles had a structure similar to that of the cathodic electrocatalyst of the $Pt_3Co/C$ type (homogeneous HAADF contrast). These are solid particles.

After 3,500 hours of operating of the PEMFC, the fraction of hollow platinum nanoparticles had been evaluated to about 35% of the total number of nanoparticles. This gives the possibility of inferring from a structural point of view, that these nanoparticles are stable on the long term under the real operating conditions of a PEMFC.

Even after 3,500 hours of operation of the PEMFC, there was always coexistence of hollow nanoparticles and of solid nanoparticles. This is explained by the fact that a restricted fraction of electrocatalyst (of the order of 20% to 50%) is actually active for the cathodic reaction. Only the particles meeting the triple contact condition: i.e. the nanoparticles in contact with the carbon and the ionomer are capable of being active. To this limitation are added other limitations related to the dynamic operating conditions of the PEMFC.

This is why, within the scope of the present invention, it is particularly advantageous to manufacture hollow platinum nanoparticles, for example as this was described above in the embodiment of the invention via a chemical route, before incorporating them into a membrane-electrodes assembly rather than making in situ nanoparticles from an electrocatalyst of the $Pt_xM/C$ type, a so-called «commercial» electrocatalyst. In this way, the electrocatalyst only comprises hollow platinum nanoparticles, which will probably be never the case if an electrocatalyst of the $Pt_xM/C$ type, a so-called «commercial» type, is used, already applied in an electrode or in a membrane-electrodes assembly.

Further, the contraction of the lattice parameter of the shell of the hollow platinum nanoparticles was determined.

No relaxation of the lattice parameter of the platinum was observed up to durations close to 3,500 hours.

The graph of FIG. 1 shows that the lattice parameter of the shell of the hollow platinum nanoparticles is slightly contracted relatively to that of platinum nanoparticles of equivalent size. This contraction is maintained on the long term during the use of the PEMFC during actual operation.

Thus, the hollow platinum nanoparticles, once they are formed, are stable over a period of 2,500 hours, while solid platinum nanoparticles of the Pt/C type or of the $Pt_xM/C$ type would be greatly modified under identical conditions.

Measurement of the Electrocatalytic Activity:

Measurement of the specific activity (referred to 1 cm² of platinum) for the oxygen reduction reaction was conducted by using a conventional electrocatalysis methodology.

To do this, a film of a thickness of a few micrometers consisting of the electrocatalyst, as detailed above, to be tested, was immobilized at the surface of a glassy carbon electrode.

This film was formed by drying a mixture containing in identical mass proportions (50-50 wt %) the electrolyzer and the Nafion® ionomer in ultrapure water. Thus, the electrocatalyst and ionomer were homogeneously distributed and made the test comparable with an electrocatalytic layer of a PEMFC electrode.

The catalytic activities were measured under identical conditions allowing direct comparison of the results for different electrocatalysts:

E=0.85 V/RHE

Aqueous electrolyte: 0.1 mol.L$^{-1}$ of sulfuric acid

T=25° C.

v=1 mV s$^{-1}$.

Figure 2:
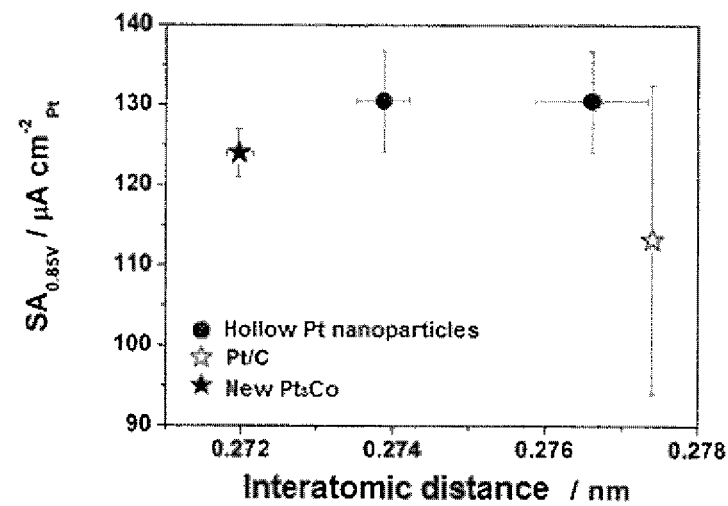
FIG. 2 is a graph expressing the electrocatalytic activity of an electrocatalyst comprising either hollow platinum particles obtained after more than 1,000 hours of use of a PEMFC during actual operation, or nanoparticles of commercial electrocatalysts of the Pt/C type and of the $Pt_3Co/C$ type.

FIG. 2 is a graph comparatively showing the catalytic activity of:
  the electrocatalyst containing hollow platinum nanoparticles obtained after 1,000 hours of use of a PEMFC during actual operation, the cathodic electrocatalyst being of the $Pt_3Co/C$ type (referenced on the graph as: « Hollow Pt nanoparticles» ) as described above for FIG. 1,
  a commercial electrocatalyst of the $Pt_3Co/C$ type (referenced on the graph as: « $Pt_3Co/C$ » ),
  an electrocatalyst of the Pt/C type (referenced on the graph as: « Pt/C » ),
and this depending on the interatomic distance of said electrocatalysts (as determined from X diffractograms).

According to FIG. 2, the electrocatalyst comprising hollow platinum nanoparticles has better catalytic activity than commercial electrocatalysts of the Pt/C or $Pt_3Co/C$ type.

It should be noted that this experimental result would be exacerbated upon considering the mass activity (as referred to the platinum mass).

Hollow platinum nanoparticles according to the invention were made in the following way:

Nanoparticles on a carbon support of the $Pt_3Co/C$ type were incorporated into a membrane-electrodes assembly and were used as an electrocatalyst at the cathode of a PEMFC.

The initial average size of these nanoparticles was comprised between 3 and 5 nm and the distribution of the platinum and cobalt atoms within these nanoparticles was homogeneous. These nanoparticles were initially dense.

A sequence of polarizations was carried out on said nanoparticles between the two following potentials:
  the selected reducing potential applied for 30 minutes was 0.2 V (this corresponds to the cell voltage or potential difference between the cathode and the anode, during operation with hydrogen (at the anode)/nitrogen (at the cathode). At this voltage, the potential of the cathode approximately had a value of 0.2 V/RHE (i.e. measured relatively to a reversible hydrogen electrode).
  the oxidizing potential was reached by carrying out 2 potential scanning cycles between E=0.05 V and E=1.23 V at a rate v=0.020 V/s.

This alternation of reducing and oxidizing potentials was repeated 130 times for an approximate period of 60 hours.

Hollow platinum nanoparticles with an approximate diameter of 5 nm, close to the initial size of the nanoparticles, were thereby obtained.

The shell was dense with an approximate thickness of 1.5 nm and was confirmed by STEM-HAADF microscopy observations.

Figure 3:
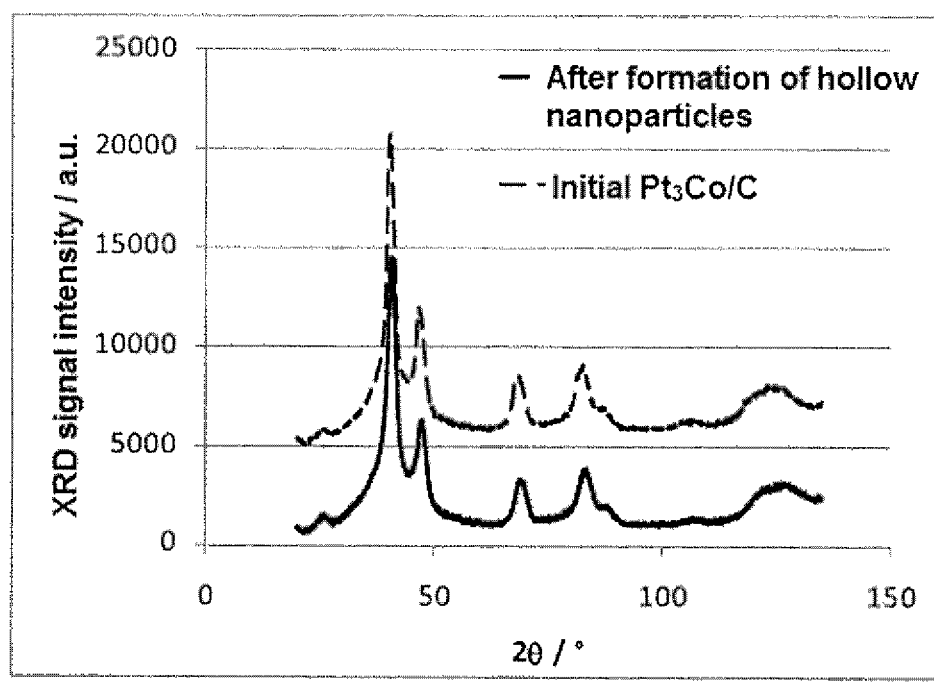
FIG. 3 illustrates an X-ray diffraction spectrum of hollow platinum nanoparticles according to the invention.

The X-ray diffraction measurements of FIG. 3 also confirm the formation of these hollow nanoparticles with an average interatomic distance of 0.2758 nm, smaller (contraction of the lattice parameter) than the one measured on a platinum nanoparticle of identical size (0.2775 nm).

Table 1 below indicates that the specific activity of hollow platinum nanoparticles according to the invention for reducing oxygen ($SA_{0.85\,V}/\mu Acm^{-2}_{Pt}$) is better than that of $Pt_3Co/C$ nanoparticles.

TABLE 1

|  | $Pt_3Co/C$ nanoparticles | Hollow platinum nanoparticles according to the invention |
|---|---|---|
| $SA_{0.85\,V}$ ($\mu A\,cm^{-2}_{Pt}$) | 120 | 130 |
| $d_V$ (nm) | 5.3 | 5.7 |

Specific activity for the oxygen reduction reaction measured in a liquid electrolyte of 0.1 mol. L$^{-1}$ of sulfuric acid at E = 0.85 V/RHE ($SA_{0.85\,V}$) and with a nanoparticle size ($d_V$)

Hollow platinum nanoparticles 1 to 3 were made according to the manufacturing method of the invention.

More precisely, nanoparticles of PtNi/C were used as starting materials and were obtained via the chemical route that was detailed above as an embodiment for obtaining $Pt_xM/C$ nanoparticles.

The PtNi/C nanoparticles were made by co-reduction of the salts $Pt(NH_3)_4Cl_2$ and $NiCl_2$ by $NaBH_4$ in aqueous medium.

The steps of the synthesis were the following:
  0.3 g of powder of carbon support (Vulcan XC-72 from Cabot) with 140 mL of deionized ultrapure water (18.2 MΩ cm, quantity of total organic impurities less than 5 ppb) and 10 mL of ethanol were mixed together under magnetic stirring;
  0.46 mmol of $Pt(NH_3)_4Cl_2$ and 0.46 mmol of $NiCl_2$ were added to the powder of carbon in suspension with the solvents;
  Reductive agent was added, i.e. 5 mL of a solution of $NaBH_4$ with a concentration of 0.22 mol.L$^{-1}$;
  The mixture was stirred under magnetic stirring during one hour;
  It was filtered and rinsed with deionized ultrapure water;
  It was dried at a temperature of 110° C. during 45 minutes.

The nature of the salts conducts to a sequential reduction. The salt of nickel is firstly reduced by $NaBH_4$ and then, the reduction of the salts of platinum and the galvanic exchange of nickel atoms previously formed by the ions $Pt^{2+}$ occur simultaneously that conducts to the formation of hollow PtNi/C nanoparticles (with a low amount of nickel).

The nanoparticles 1 were obtained at the end of step b) of the manufacturing method according to the invention that was carried out on a thin active layer deposited on the tip of a rotating disk electrode, according to the following parameters:

Under an atmosphere of argon;
Electrolyte comprising a solution of 0.1 mol.L$^{-1}$ of sulfuric acid;
20 cycles at 20 mVs$^{-1}$ with a reducing potential of 0 V/RHE and an oxidizing potential of 1.23 V.RHE (total duration of 41 minutes).

The nanoparticles 2 were obtained at the end of step b) of the manufacturing method according to the invention that was carried out on a thin active layer deposited on the tip of a rotating disk electrode, according to the following parameters:

Under atmosphere of argon;
Electrolyte comprising a solution of 0.1 mol.L$^{-1}$ of sulfuric acid;
60 cycles at 20 mVs$^{-1}$ with a reducing potential of 0 V/RHE and an oxidizing potential of 1.23 V.RHE (total duration of 123 minutes).

The nanoparticles 3 were obtained at the end of step b) of the manufacturing method according to the invention that was carried out on a thin active layer deposited on the tip of a rotating disk electrode, according to the following parameters:

Under an atmosphere of dioxygen;
4 cycles at 2 mVs$^{-1}$ with a reducing potential of 0.4 V/RHE and an oxidizing potential of 1.05 V.RHE (total duration of 43.3 minutes).

In the difference of nanoparticles 1 and 2, for these nanoparticles 3, step b) was preceded with an acidic washing during 12 hours in a solution of sulfuric acid at a concentration of 1 mol.L$^{-1}$ that finalized the above detailed chemical route. This last step of washing was destined to eliminate the residual nickel atoms which were present on the surface of the carbon support and not covered with platinum atoms or present in the shell of the hollow nanoparticles.

The catalytic activities of these nanoparticles 1 to 3 were measured under identical conditions allowing a direct comparison of the results:

Aqueous electrolyte: 0.1 mol.L$^{-1}$ of sulfuric acid;
T=25° C.;
v=2 mV s$^{-1}$;
Measurement at E=0.85 V/RHE and E=0.9 V/RH.

The specific activity of these hollow platinum nanoparticles 1 to 3 for the oxygen reduction was on average:

550 µA cm$^{-2}_{pt}$ (measured at E=0.85 V/RHE), against 180 µA cm$^{-2}_{pt}$ for solid Pt/C nanoparticles from E-TeK (i.e. a commercial catalyst of the reference E-TeK) with an identical carbon support Vulcan XC-72 from Cabot, $m_{pt}/(m_{pt}+m_c)$=40%) and
200 µA cm$^{-2}_{pt}$ (measured at E=0.9 V/RHE), against 50 µA cm$^{-2}_{pt}$ for solid Pt/C nanoparticles from E-TeK (i.e. a commercial catalyst of the reference E-TeK) with an identical carbon support: Vulcan XC-72 from Cabot, $m_{pt}/(m_{pt}+m_c)$=40%).

Thus, the specific activity of the hollow platinum nanoparticles 1 to 3 for the oxygen reduction is higher than:
the specific activity of solid Pt/C nanoparticles, by a factor from about 3 to 4, and
the specific activity of Pt$_3$Co/C nanoparticles (see Table 1 above).

The invention claimed is:

1. A method for manufacturing hollow platinum nanoparticles comprising a dense and single-crystal shell having a thickness of from 0.2 nm to 5 nm and a first central cavity and optionally at least one second cavity at a periphery of the first central cavity, wherein the nanoparticle has a diameter in a range of from 3 nm to 20 nm, is quasi-spherical in shape, and does not comprise a non-noble metal alloy element, the method comprising the following steps:
a) placing Pt$_x$M/C nanoparticles into a polarization device, where:
Pt is platinum;
x is in a range of from 0.2 to 10;
M is a metal less noble than platinum;
C is carbon; and
Pt and M are supported on the carbon;
b) subjecting the nanoparticles for a plurality of times to a sequence of polarizations between the two following potentials:
a reducing potential of from 0 to 0.5 volts relative to a reversible hydrogen electrode (V/RHE), and
an oxidizing potential of from 0.6 to 1.4 V/RHE, until single-crystal hollow platinum nanoparticles are obtained having a diameter of from 3 nm to 20 nm and a dense shell having a thickness of from 0.2 nm to 5 nm,
wherein the polarization device is a rotary conducting drum, and the step b) is carried out in an electrolytic solution.

2. The method according to claim 1, wherein step b) is carried out until single-crystal hollow platinum nanoparticles are obtained with a diameter of from 3 nm to 10 nm and a dense shell having a thickness of from 0.277 nm to 0.831 nm.

3. The method according to claim 1, wherein the sequence of polarizations of step b) is carried out with:
a succession of linear ramps of rising and falling potentials at a potential scanning rate in a range of 1 to 1,000 mV s$^{-1}$;
a succession of plateaus of potentials with a duration of from 1 to 36,000seconds; or
a mixture of ramps and plateaus for rising and falling potential phases.

4. The method according to claim 1, wherein the sequence of polarizations has a rectangular profile, for which:
the reducing potential is in a range of 0.05 V/RHE to 0.5 V/RHE; and
the oxidizing potential is in a range of 0.8 to 1 V/RHE.

5. The method according to claim 1, wherein the Pt$_x$M/C nanoparticles are obtained by the method comprising:
a') forming colloidal nanoparticles of the metal M on a carbon support from a M$^{z+}$metal salt to obtain M/C nanoparticles, and
b') depositing platinum on the M/C nanoparticles obtained at the end of step a').

6. The method according to claim 1, further comprising after step b):
c) cleaning the nanoparticles in an acidic solution.

7. The method according to claim 6, further comprising after step c):
c') heating the nanoparticles in an oven at a controlled temperature in a range of 100° C. to 600° C. for 10 minutes to 10 hours.

8. The method according to claim 6, further comprising after step c):
c') subjecting the nanoparticles to a sequence of polarizations in an electrolytic solution that is different from the electrolytic solution of step b).

9. The method according to claim 7, wherein step c') is carried out under a controlled atmosphere which is neutral, oxidative, or reductive.

* * * * *